(12) United States Patent
Singh

(10) Patent No.: US 8,048,501 B2
(45) Date of Patent: Nov. 1, 2011

(54) SEALABLE, PEELABLE FILM COMPRISING A BLOCK COPOLYMER PEELABLE CORE LAYER

(75) Inventor: Shalendra Singh, Carlisle (GB)

(73) Assignee: Innovia Films Limited, Wigton, Cumbria (GB)

( * ) Notice: Subject to any disclaimer, the term of this patent is extended or adjusted under 35 U.S.C. 154(b) by 0 days.

(21) Appl. No.: 12/299,797

(22) PCT Filed: Apr. 26, 2007

(86) PCT No.: PCT/GB2007/050215
§ 371 (c)(1),
(2), (4) Date: Nov. 25, 2008

(87) PCT Pub. No.: WO2007/135451
PCT Pub. Date: Nov. 29, 2007

(65) Prior Publication Data
US 2009/0239011 A1    Sep. 24, 2009

(30) Foreign Application Priority Data
May 19, 2006 (GB) .................................. 0609940.2

(51) Int. Cl.
C09J 7/02 (2006.01)
B32B 7/12 (2006.01)
B32B 3/26 (2006.01)
B32B 1/02 (2006.01)
B32B 3/10 (2006.01)

(52) U.S. Cl. ....... 428/35.7; 428/343; 428/349; 428/515; 428/516; 428/318.4

(58) Field of Classification Search .................. 428/515, 428/516
See application file for complete search history.

(56) References Cited

U.S. PATENT DOCUMENTS

| | | | |
|---|---|---|---|
| 5,358,792 A | | 10/1994 | Mehta et al. |
| 5,443,915 A | | 8/1995 | Wilkie et al. |
| 5,482,780 A | | 1/1996 | Wilkie et al. |
| 5,500,265 A | | 3/1996 | Ambroise et al. |
| 5,508,113 A | * | 4/1996 | Knoerzer .................... 428/500 |
| 5,527,608 A | | 6/1996 | Kemp-Patchett et al. |
| 5,716,698 A | | 2/1998 | Schreck et al. |
| 5,997,968 A | | 12/1999 | Dries et al. |
| 6,231,975 B1 | | 5/2001 | Kong et al. |
| 6,248,442 B1 | | 6/2001 | Kong et al. |
| 6,590,034 B2 | * | 7/2003 | Wanic et al. ................... 525/191 |
| 2002/0022125 A1 | * | 2/2002 | Sperlich et al. ............... 428/336 |
| 2002/0187326 A1 | * | 12/2002 | Kong ............................ 428/220 |
| 2003/0021930 A1 | * | 1/2003 | Mientus et al. .............. 428/40.1 |
| 2004/0105994 A1 | * | 6/2004 | Lu et al. ........................ 428/515 |
| 2004/0115457 A1 | * | 6/2004 | Kong ............................ 428/515 |
| 2006/0233987 A1 | * | 10/2006 | Mumpower ................. 428/35.2 |

FOREIGN PATENT DOCUMENTS

| | | |
|---|---|---|
| DE | 4410235 A1 | 9/1995 |
| EP | 0746468 A1 | 12/1996 |
| EP | 0987290 A1 | 3/2000 |
| EP | 1283242 A1 | 2/2003 |
| JP | 09150488 A | 6/1997 |
| JP | 11099595 A | 4/1999 |
| JP | 2006001055 A | 1/2006 |
| WO | 9604178 A1 | 2/1996 |
| WO | 9832596 A1 | 7/1998 |
| WO | 2004056567 A2 | 7/2004 |
| WO | 2005033195 A1 | 4/2005 |
| WO | 2006058875 A1 | 6/2006 |
| WO | 2007010309 A2 | 1/2007 |

OTHER PUBLICATIONS

International Preliminary Report on Patentability (International Application No. PCT/GB2007/050215; filed Apr. 26, 2007).
International Search Report; Written Opinion of International Searching Authority, (International Patent Application No. PCT/GB2007/050215 filed Apr. 26, 2007).
GB Search Report under Section 17, (GB Patent Application No. GB0609940.2 filed May 19, 2006).

* cited by examiner

Primary Examiner — Hoa (Holly) Le
Assistant Examiner — Ronak Patel
(74) Attorney, Agent, or Firm — Ping Wang; Andrews Kurth, LLP

(57) ABSTRACT

The present invention concerns a sealed package formed from a polymer film comprising a block copolymeric substrate and a heat sealable coating and/or skin layer on the substrate, the package being formed by wrapping the film around an article to be packaged in a manner to obtain at least one region of film overlap, and heat sealing the resulting overlapped film sections to each other to provide at least one sealed region of the package, the sealed region being subsequently openable by manually separating the overlapped film sections, effective without substantial tearing of the film at or around the sealed region.

11 Claims, No Drawings

SEALABLE, PEELABLE FILM COMPRISING A BLOCK COPOLYMER PEELABLE CORE LAYER

This application is a 371 of PCT/GB07/050215, filed on Apr. 26, 2007, which claims priority to United Kingdom Patent Application No. 0609940.2 filed on May 19, 2006. The entirety of the aforementioned applications is incorporated herein by reference.

FIELD

The present invention relates to a sealable, peelable film and to a manufacturing method for such a film.

BACKGROUND

WO-A-96/04178 discloses a peelable film comprising a core layer comprising an olefin polymer and a heat-sealable layer comprising a blend of low density polyethylene (LDPE) and a material incompatible with the LDPE, such as an olefin polymer or a co- or terpolymer of ethylene, propylene or butylene. The film structure can be heat-sealed to a plastic container to form the lid of the container, or to itself to form a package.

EP-A-746468 describes a multi layer film which peels by rupture within what is referred to in the specification as an intermediate layer between a base layer and a heat sealable layer. The intermediate layer is said to comprise preferably a blend of polymers which do not co-crystallise.

U.S. Pat. No. 5,443,915 discloses an oriented polyolefin film having a white-opaque cold seal-receptive skin layer on one side of a core layer and a vacuum deposited metal layer on the other side of the core layer.

U.S. Pat. No. 5,358,792 discloses a heat-sealable composition comprising (a) from about 30 to about 70 wt % of a low-melting polymer comprising a very low density ethylene-based copolymer defined by a density in the range of about 0.88 g/cm3 to about 0.915 g/cm3, a melt index in the range of about 1.5 dg/min to about 7.5 dg/min, a molecular weight distribution (Mw/Mn) no greater than about 3.5 and (b) from about 70 to about 30 wt % of a propylene-based polymer.

U.S. Pat. No. 5,482,780 discloses an oriented polymeric α-olefin film having: an isotactic propylene homopolymer core; a cold seal release skin layer adherent to one side of the core; and a surface treated cold seal receptive layer or such treated layer with a cold seal cohesive composition over the surface treatment of said layer on the other side of the core. The cold seal release skin layer comprises a slip agent and a blend of two polymers, namely, an ethylene-propylene random copolymer containing about 2% to 8% of ethylene in such copolymer and an ethylene-butylene copolymer containing about 0.5% to 6% of ethylene in such copolymer. The cold seal receptive layer is of an ethylene-propylene random copolymer containing about 2 to 8% of ethylene.

U.S. Pat. No. 5,500,265 discloses a peelable film comprising (a) a core layer comprising an olefin polymer, (b) a skin layer on at least one surface of the core layer, the skin layer comprising: a blend of a butylene polymer with another olefin polymer or a polymer of butylene and at least one other olefin, and (c) a coating layer on the skin layer.

U.S. Pat. No. 5,716,698 relates to a peelable, oriented, opaque, multilayer polyolefin film comprising at least one opaque layer and a peelable top layer.

U.S. Pat. No. 6,248,442 relates to multilayer films that are heat-sealable over a broad temperature range. The '442 patent also relates to multilayer films that provide easy-opening and hermetic seals to packages. The films of the '442 patent are made up of a core layer comprising linear low density polyethylene (LLDPE) and at least one skin layer having a melting point of at least 10° C. below the core layer melting point.

U.S. Pat. No. 5,997,968 discloses a multilayer polyolefin film comprising at least three coextruded layers comprising an opaque base layer, an intermediate layer, and an outer peelable surface layer composed of two incompatible polyolefins, wherein the intermediate layer contains at least 80% by weight of a polyolefin having a lower melting point or lower glass transition temperature than the polyolefin forming the base layer.

U.S. Pat. No. 6,231,975 discloses a sealable film comprising an inner layer of any olefin polymer, a sealing layer and a separable layer positioned there between. The separable layer comprises an ethylene-propylene copolymer or a blend of polyethylene and another olefin, which forms an incompatible mixture or blend.

Another type of peelable seal is described in our co-pending United Kingdom patent application 0514785.5.

There is on ongoing need for improved products in the field of sealable and peelable film structures. In particular, a need still exists for a film structure that has a sealable outer layer that seals well to itself or other surfaces over a broad temperature and/or pressure range and which is able to peel within one layer of a multi-layer film, and yet which maintains acceptable characteristics for the film's end use in terms of at least one of gloss, haze, opacity, printability and COF. In particular there is a need for peelable films which can be readily opened without creating a "z-direction" tear. In stretched polyolefin films, in particular biaxially orientated polypropylene films, the mechanical strength of seal seams is often higher than that of the film itself, and therefore when a sealed pack is opened is not only the seal seam which is broken apart. Typically a tear propagates in an uncontrolled manner through the entire film upon opening. Peelable films are films which once sealed can be separated again mechanically without damaging or destroying the film itself. Peelable seal layers are typically required to have good sealing properties and also permit controlled opening of a bag or package. A peelable heat sealable film can be formed when a coated film is formed by coating a biaxially oriented polypropylene film formed as a multi layer film with a core of a homopolymer of polypropylene with a skin layer formed on each side or major surface of the core with a heat sealable coating. Such skin layers may be formed from copolymers such as copolymers of propylene and ethylene including block copolymer. The skin layer formed as a melt coat during the production of the film is believed to give a peeling seal when coated by virtue of incompatible phases in the melt coat. This limits the plain of failure to the melt coat itself, away from the core layer avoiding any possibility of a tearing seal in the core. The result is that the seal is weaker than a conventional seal but gives the same seal strength throughout the pool, and doesn't tear. A z-direction tear disrupts the integrity of a multilayer film when the film is pulled apart at the seal. A film with a z-direction tear has not simply separated at the seal line. Instead, the separation, or tear, has extended to other layers of the film. It is difficult to properly reclose a package that has a z-direction tear, thereby hampering the ability of the package to maintain the freshness or integrity of its contents. When z-direction tears can be eliminated, packages are easily refolded and sealed by simple mechanical means, such as a clip or adhesive label.

SUMMARY

It is an object of the invention to provide a sealable polymer film having peelability.

It is another object of the invention to provide a thermoplastic film structure with a sealable outer layer that seals well over a broad temperature range.

A further object of the invention is to provide a thermoplastic film structure with a sealable outer layer that, when sealed, can be readily opened without creating a z-direction tear.

It is a further object of the invention to provide such as films for wrapping and peelably sealing articles or products.

The present invention further provides a sealed package formed from a polymer film comprising a block copolymeric substrate and a sealable coating and/or skin layer on the substrate.

DETAILED DESCRIPTION

It is an object of the invention to provide a sealable polymer film having peelability. It is another object of the invention to provide a thermoplastic film structure with a sealable outer layer that seals well over a broad temperature range. A further object of the invention is to provide a thermoplastic film structure with a sealable outer layer that, when sealed, can be readily opened without creating a z-direction tear. It is a further object of the invention to provide such as films for wrapping and peelably sealing articles or products.

It has now been discovered that peelable, sealable films can be obtained in a multilayer film in which a block copolymeric component is provided in the core. It is believed, although the invention described herein is not bound or limited by this theory, the film of the invention peels in the core layer.

Biaxially oriented films comprising block copolymer cores are known in connection with a number of applications. For example, WO-A-2005/033195 discloses an impact copolymer film having defined water vapour transmission rate properties which are said to be useful in food packaging applications. EP-A-0987290 discloses similar films for similar purposes. Yet further food packaging films utilising the gas and vapour transmission properties of block copolymeric films are taught in WO-A-2004/056567. However, the use of a block copolymeric material in the core layer of a multi layer film provided with a sealable outer layer, wherein the sealed film is rendered peelable in the block copolymer core has not hitherto been realised.

According to the present invention there is provided a sealable and peelable film comprising a block copolymeric substrate and a sealable coating and/or skin layer thereon.

The film of the invention is preferably a multilayer film comprising a block copolymeric core layer and at least one a sealable skin layer. The skin layer may be inherently sealable, or may be coated with a sealable coating.

Preferably, the at least one skin layer is coated with a sealable coating.

By "sealable" is meant heat sealable, cold sealable, pressure sealable, or any suitable combination thereof. For most applications, heat sealable films will be used.

The block copolymeric substrate or core layer preferably comprises over 90%, more preferably over 95%, still more preferably over 97.5% of the total film thickness.

In one embodiment of the invention the core layer is composed entirely of the block copolymeric substrate. In an alternative embodiment the block copolymeric substrate may be blended with one or more other suitable materials to form the core layer, provided that the core layer retains its peelable characteristic.

The core layer may be non-cavitated, or may be cavitated if an opaque film is desired.

Sealable and peelable film structures according to the present invention may also include one or more intermediate layers positioned between the core layer comprising the peelable block copolymeric substrate and the sealable outer layer.

One advantage of the present sealable and peelable films is that peelability is provided in the core, allowing the manufacturer freedom to adapt the skin layer(s) and/or intermediate layer(s) and/or coating(s) to meet manufacturing requirements of, for example, gloss, haze, opacity, printability, COF, etc.

The films of the invention will commonly find application in the packaging of articles of commerce, for example in reamwrap and overwrap applications.

According to the present invention there is provided a sealed package formed from a polymer film comprising a block copolymeric substrate and a sealable coating and/or skin layer on the substrate, the package being formed by wrapping the film around an article to be packaged in a manner to obtain at least one region of film overlap, and heat sealing the resulting overlapped film sections to each other to provide at least one sealed region of the package, the sealed region being subsequently openable by manually separating the overlapped film sections, effective without substantial tearing of the film at or around the sealed region.

Without wishing to be bound by the theory, it seems likely that the block copolymeric substrate provides the desired peelability by allowing the heat sealed film to peel away from its overlapped neighbour by peeling off within the block copolymeric core of the film.

Preferably, the polymer film is a multilayer film comprising the block copolymeric substrate and at least one skin layer of a different material. The at least one skin layer may be a polymeric material, and may comprise be homopolymeric and/or copolymeric materials, and may be a blend of two or more such materials. The skin layer may be provided on the substrate by coextrusion, by lamination, or by any other suitable method. Preferably, the skin layer is a coextrudate. The skin layer may also be formed from a peelable material, for example from a block copolymeric material. Alternatively, the skin layer may be non-peelable, and may for example comprise a non-block copolymeric structure, for example a random copolymeric structure, a homopolymeric structure or a suitable blend of materials.

The presence of a skin layer may assist in the realisation of the invention in its more preferred aspects because peeling initiated in the core, between two block copolymeric components for example, may be prevented or hindered from propagating beyond the core layer. Propagation of the peel through the skin layers of the film may give rise to a tearing film rather than a peelable film.

Accordingly, the invention provides in one of its preferred aspects a sealed package formed from a polymer film comprising a block copolymeric substrate and at least one skin layer on the substrate, the skin layer being formed from a sealable material, or otherwise being coated with a sealable coating, the package being formed by wrapping the film around an article to be packaged in a manner to obtain at least one region of film overlap, and sealing the resulting overlapped film sections to each other to provide at least one sealed region of the package, the sealed region being subsequently openable by manually separating the overlapped film sections, effective without substantial tearing of the film at or around the sealed region.

Preferably the sealable material and/or the sealable coating is a heat sealable material and the overlapped film sections are sealed to each other by heat sealing.

Preferably, the film used in forming the sealed packages of the invention comprises a block copolymeric substrate, at least one skin layer and a heat sealable coating on the skin layer.

Generally, for ease of manufacture, the film will comprise a block copolymeric core substrate sandwiched between skin layers of the same material, the skin layers being formed on the substrate by coextrusion therewith, and a heat sealable coating on one surface, preferably only one surface, of the resulting film.

The sealed package of the invention is preferably formed by severing a sheet of the polymeric film from a web of the film and wrapping the severed polymeric film sheet around an article to form a film tube with wrapped ends overlapping and sealing the overlapped ends to form a girth seal. Preferably the tube is then closed at each end and sealed to form an envelope or parcel seal.

One particular application of the film and sealed packages of the invention is in ream wrap.

Reams of cut paper for copy machines, computers, printers and other applications are most commonly packaged for shipping, storage and retail sale in ream wrappers made of various wrap materials. These wrap materials have traditionally been paper, plastic film, or a paper/plastic film laminate.

The wrap materials protect the wrapped paper product from physical damage and moisture pick up during shippage and storage. The wrap materials also protect the wrapped product from physical damage during repeated handling and stocking on retail shelves.

The distribution of reams of papers has changed from boxes for larger users to wrapped reams for sale in individual packages containing e.g. 500 sheets. Such distribution of reams of papers has placed increasing demands on the wrapper due to more frequent handling of the individual reams. Increased handling of the reams has resulted in more reams breaking open, damaging the wrapped paper product by allowing to pick up moisture, tear or get minor curl—physical damage that ultimately results in jams in the end—user's printer or copy machine. However the resultant ability of a package to avoid damage arising from handling means that the packaged product is more difficult to open.

One way of overcoming this problem would be to provide sealing means that possess a mechanical resistance sufficient to maintain the seal intact during storage and transport until such time as the packaging or wrapping is to be opened but the package remains capable of being opened manually at or near the seal without risk of damaging the wrapped paper product.

The invention is particularly applicable in the field of ream wrap technology. Thus, according to the invention there is provided a sealed ream wrap package in which the packaged article is a stack of paper.

The films of the invention are also especially applicable in the field of overwrap.

The block copolymeric substrate preferably comprises at least one olefinic component. More preferably, at least two olefinic components are present, the block copolymer being at least partially formed by the block copolymerisation of one olefinic component, or mixture of olefinic components, with another olefinic component, or mixture of olefinic components. For example, the block copolymeric substrate may comprise polypropylene and polyethylene.

Also provided in accordance with the present invention is a sealed package comprising polymer film in accordance with the above printed on its skin layer with at least one ink.

The film or the skin layer of the film may comprise additional materials such as anti-block additives, opacifiers, fillers, UV absorbers, cross-linkers, colourants, waxes and the like.

The film of the invention may be further treated, by corona discharge treating for example, further to improve ink receptivity of the film or of the skin layer of the film.

The film substrate may comprise a blend of the block copolymeric substrate with another polymeric material, for example polyethylene, polypropylene, mixtures thereof, and/or other known polyolefins.

The polymeric film can be made by any process known in the art, including, but not limited to, cast sheet, cast film, or blown film. This invention may be particularly applicable to films comprising cavitated or non-cavitated polypropylene films, with a block copolymer polypropylene/polyethylene core and skin layers with a thickness substantially below that of the core layer and formed for example from random co-polymers of ethylene and propylene or random terpolymers of propylene, ethylene and butylene. The film may comprise a biaxially orientated polypropylene (BOPP) film, which may be prepared as balanced films using substantially equal machine direction and transverse direction stretch ratios, or can be unbalanced, where the film is significantly more orientated in one direction (MD or TD). Sequential stretching can be used, in which heated rollers effect stretching of the film in the machine direction and a stenter oven is thereafter used to effect stretching in the transverse direction. Alternatively, simultaneous stretching, for example, using the so-called bubble process, or simultaneous draw stenter stretching may be used.

The films used in accordance with the present invention can be of a variety of thicknesses according to the application requirements. For example they can be from about 10 to about 240 μm thick and preferably from about 50 to about 90 μm thick.

In a multi-layer film in accordance with the invention having at least a substrate later and a skin layer, the skin layer is preferably ink printable. The skin layer has a thickness of from about 0.05 μm to about 2 μm, preferably from about 0.1 μm to about 1.5 μm, more preferably from about 0.2 μm to about 1.25 μm, most preferably from about 0.3 μm to about 0.9 μm.

The invention will now be more particularly described with reference to the following examples.

Example 1

Preparation of Film

A three layer polymeric tube was formed by coextruding a core layer (of polypropylene homopolymer in the Comparative Example, and of a polypropylene-polyethylene block copolymer in the Example according to the invention) with a layer of polyethylene/polypropylene/polybutylene terpolymer (a random copolymer) as a skin layer on one side of the core layer, and with a blend of polypropylene/polyethylene and polypropylene/polybutylene random copolymers as a lamination layer on the other side of the core layer. The tube was cooled and subsequently reheated before being blown to produce a three layer biaxially oriented film tube. The film tube was then nipped and laminated to form a laminated film having an inner lamination layer of approximately 0.7 μm thickness, a core layer of approximately 28 to 29 μm thickness on either side of the lamination layer, and a random terpolymer skin layer of approximately 0.3 μm thickness.

The laminated film was then primed with a polyethyleneimine primer and coated on one side with an acrylic coating. The acrylic coating was formulated as a production batch using as a source of the acrylic material present in the coating WB1240. WB1240 is an acrylic copolymer dispersion in water supplied by UCB Surface Specialties of Rue d'Anderlecht 33 B-1620 Drogenbos Belgium and the quantity used was that necessary to give a coating composition on the film in which the WB1240 formed 92.5 wt % of the entire coating. The coating composition also contained 0.25 wt % of polymethylmethacrylate particles as antiblock and 7.5 wt % of Carnauba wax.

The uncoated laminated film compositions are presented in Table 1:

TABLE 1

| Film | Core | Inner | Outer |
| --- | --- | --- | --- |
| Example 1 | Block Copolymer (PP/PE) | Lamination Polymer (PP/PE, PP/PB Blend) | Random Terpolymer (PP/PE/PB) |
| Comparative Example 1a | Homopolymer (PP) | Lamination Polymer (PP/PE, PP/PB Blend) | Random Terpolymer (PP/PE/PB) |

Both films exhibited satisfactory characteristics for ream wrap application with respect to their gloss, wide and near angle haze, Ct adhesion, blocking side and COF measurements, all of which were conducted in accordance with standard procedure.

The coated films were then heat sealed around a paper stack to form a sealed ream wrap package. The film seals were found to be tear seals in the Comparative Example, and peel seals in the Example in accordance with the invention.

What is claimed is:

1. A sealable and peelable film consisting of a block copolymeric peelable core layer which consists of over 95% of the film thickness, and at least one sealable, non-peelable skin layer comprising a polyethylene/polypropylene/polybutylene terpolymer, wherein said skin layer has a thickness from about 0.1 µm to about 1.5 µm.

2. The film according to claim 1, wherein the sealable skin layer is heat sealable.

3. The film according to claim 1, wherein the film is a cavitated film.

4. The film according to claim 1, wherein the film is a non-cavitated film.

5. The film according to claim 1, wherein the film is in the form of a package.

6. The film according to claim 1, wherein the block copolymeric peelable core layer comprises at least one olefinic component.

7. The film according to claim 6, wherein the block copolymeric peelable core layer comprises at least two olefinic components, the block copolymer being at least partially formed by the block copolymerization of one olefinic component, or mixture of olefinic components, with another olefinic component, or mixture of olefinic components.

8. The film according to claim 7, wherein the block copolymeric peelable core layer comprises polypropylene and polyethylene.

9. The film according to claim 6, wherein the block copolymeric peelable core layer comprises polypropylene and polyethylene.

10. A sealable and peelable film consisting of a block copolymeric peelable core layer which consists of over 95% of the film thickness, and at least one sealable, non-peelable skin layer comprising a polyethylene/polypropylene/polybutylene terpolymer, wherein said non-peelable skin layer is coated with a sealable coating, and wherein said non-peelable skin layer has a thickness from about 0.1 µm to about 1.5 µm.

11. A sealable and peelable film consisting of a block copolymeric peelable core layer which consists of over 95% of the film thickness, and at least one sealable, non-peelable skin layer comprising a polyethylene/polypropylene/polybutylene terpolymer, wherein said sealable, non-peelable skin layer is printed with at least one ink and has a thickness from about 0.1 µm to about 1.5 µm.

* * * * *